INVENTORS
HAROLD EBNETH
AND HANS FALK

By Clell W. Upchurch
ATTORNEY

United States Patent Office
2,948,928
Patented Aug. 16, 1960

2,948,928

PROCESS FOR MANUFACTURING FOAMED POLYURETHANE ARTICLES

Harold Ebneth and Hans Falk, Leverkusen, Germany, assignors, by mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware Filed Dec. 17, 1956, Ser. No. 628,579

Claims priority, application Germany Dec. 16, 1955

2 Claims. (Cl. 18—48)

This invention relates generally to a method for making porous plastics from liquid components which, when mixed together, form a solid product.

It has been disclosed that porous plastics may be formed by mixing together a polyisocyanate and an organic compound having a reactive hydrogen atom. These compounds react chemically with each other to form a polyurethane compound. It is preferred to use a polyhydroxyl compound and water is usually added in order to produce carbon dioxide which forms the pores in the resulting polyurethane product. Activators or catalysts are included in the formulation in order to control the reaction rate and the characteristics of the finished product.

It is necessary that the various components going into the polyurethane plastic be rapidly mixed together and poured into a suitable molding device before completion of the chemical reaction. An apparatus that is admirably suited for this purpose is disclosed in U.S. Patent 2,764,565 granted to P. Hoppe et al. September 25, 1956. This apparatus provides a means for intimately mixing the catalyst and other components of the polyurethane plastic together and permits accurate variation of the proportion of components in the mixture as required to obtain the desired degree of rigidity or flexibility in the finished foam. It has been found, however, that relatively large slabs of the polyurethane plastic foam made with this apparatus may have a tendency to crack and the product may not always have a cellular structure that is relatively uniform in cell size. It has been proposed to include a paraffin oil or silicon oil in the formulation to avoid cracking of the hardened slab, but such additives remain in the finished foam thereby resulting in a product which may have undesirable chemical composition and undesirable mechanical properties. Moreover, such additives may foul the mixing equipment and troublesome and time-consuming cleaning operations may be required at frequent intervals.

Another object of the invention is to provide a method for making polyurethane foam plastics having improved uniformity of pore size and improved physical characteristics. Still another object of the invention is to provide a process for making polyurethane foam plastics of substantially uniform pore size and substantially free from voids. A still further object of the invention is to provide a method for making large slabs of polyurethane foam plastic of substantially uniform pore or cell size having such physical characteristics that there is little or no tendency for the hardened foam product to crack. Another object of the invention is to provide a method for making polyurethane foam plastics, without the addition of undesirable oils, that have improved chemical and mechanical properties, resist cracking and have a substantially uniform cell structure.

Other objects will become apparent from the following description with reference to the accompanying drawing in which—

Figure 1:
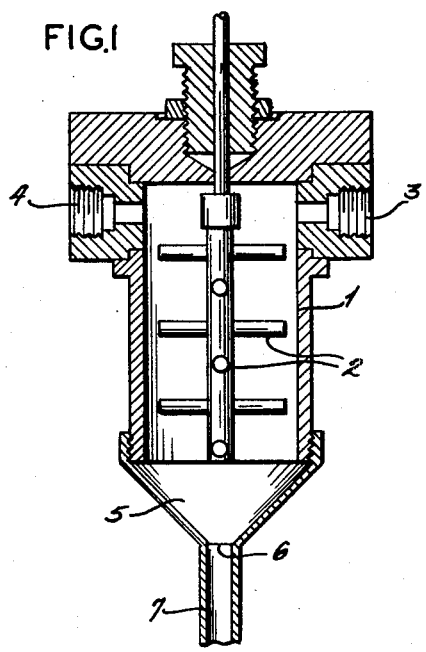
Figure 1 is a longitudinal sectional view of one embodiment of the invention.

The foregoing objects are accomplished in accordance with this invention by providing an apparatus having a substantially enclosed mixing zone in which the liquid components of a polyurethane foam plastic may be mixed together and means for discharging the resulting mixture from the mixing apparatus through a conduit. This conduit preferably communicates with a suitable means for shaping the polyurethane reaction mixture as chemical reaction proceeds and the mixture changes from a liquid into a solid or non-fluid porous product.

In accordance with this invention, the mixture of components which react to form the polyurethane foam plastic is prepared in the usual way, such as by the process disclosed in U.S. Patent 2,764,565 or by any other suitable process. The organic compound having the reactive hydrogen atom, which is conveniently an hydroxyl polyester or an hydroxyl polyether, may be pumped or otherwise moved from a suitable storage vessel into the mixing zone where it is mixed with a polyisocyanate and a suitable catalyst or activator is introduced into the mixing zone under a pressure greater than the pressure in the mixing zone. In order to assure substantially complete mixing of the activator with the viscous polyester, the activator is injected into the mixing zone containing the polyester either continuously or intermittently. If intermittent injection is utilized, the frequency of the injection rate should be from about 50 to about 10,000 injections per minute with an injection rate of about 2,000 to about 10,000 injections per minute being preferred.

It has been found that it is possible to predetermine the cell or pore size of the finished polyurethane foam plastic by passing the reaction mixture through a conduit and by controlling the time the reaction mixture of components spends in the conduit adjacent the discharge orifice of the mixing chamber. The period of dwell in the conduit may be predetermined by means of the cross-sectional dimensions of the conduit or by means of the length of the conduit extending from the discharge nozzle. It has been found that the size of the pore of the polyurethane foam plastic becomes larger as the diameter of the conduit is decreased. For example, with a given composition, it was found that a product poured from a mixing zone through a conduit about 10 centimeters long and about 20 millimeters in diameter had from about 260 to about 320 pores per square centimeter each having a diameter of from about 0.25 to about 0.35 millimeter. The same composition poured through a conduit of the same length but having a diameter of about 10 millimeters containing from about 140 to about 180 pores per square centimeter having a diameter of from about 0.45 to about 0.55 millimeter.

It is preferred to provide the apparatus with a conduit having a means for easily adjusting the diameter without changing the conduit. For example, the conduit may be provided with a globular valve or other suitable valve for throttling the flow of liquid through the conduit. Likewise, the conduit may be made of a flexible material and may be provided with a suitable clamp for adjusting the diameter of the conduit to suitably restrict the flow of the reaction mixture therethrough. Any other suitable means for predetermining the internal diameter of the conduit including the use of a set of interchangeable conduits of various diameters or of a diaphragm or other partial blocking means may be utilized, it being important only that the conduit diameter and length be controlled by following the rule that the smaller the cross-sectional dimension of the conduit or the longer the conduit, the smaller the number of pores per unit area and the larger the pore. The rule may also be stated thus: the longer the reaction mixture is retained in the conduit, the larger the pores and the smaller number thereof per unit area of foamed product. It is preferred to use a tubular extension or conduit having a means for varying the diameter.

Any suitable polyisocyanate, including those disclosed in U.S. Patent 2,764,565, may be utilized in preparing the foamable mixture. Specific examples include 2,4-toluylene diisocyanate, 2,6-toluylene diisocyanate, 1,4-phenylene diisocyanate, triphenylmethane-4,4',4''-triisocyanate, 1,5-naphthylene diisocyanate, diphenylmethane-4,4'-diisocyanate, and 4,4'-diphenyldimethylmethane diisocyanate and the like. Water is usually used as the cross-linking agent in order to insure proper porosity in the finished product, but any other cross-linker producing this result may be used. The chemical components react together to form a polyurethane plastic and carbon dioxide which is evolved and forms the pores in the resulting solid polyurethane plastic.

Any suitable catalyst may be utilized, including heavy metal compounds and tertiary amines, such as, for example, dimethylhexahydroaniline, diethylhexahydroaniline, reaction products of N,N'-diethylaminoethanol and phenylisocyanate, ester amines, sodium phenylates and the like. In many cases it is preferred to employ what is commonly referred to as an activator mixture, i.e., a mixture comprising a catalyst, a surface active agent and a small amount of water.

The organic compound having the reactive hydrogen atom may be a polyester, either linear or branched, a polyesteramide, a polyethylene ether glycol or the like, or, in some instances, it may be a mixture of one or more of these materials. The polyesters may be prepared by reaction between any suitable polycarboxylic acids and preferably a dicarboxylic acid. Adipic, sebacic, 6-aminocaproic, phthalic, isophthalic, terephthalic, maleic, cyclohexane-1,2-dicarboxylic, and the like, including those disclosed in the aforesaid patent, may be utilized for reacting with a suitable glycol or other polyhydric alcohol to form the polyester. The various polyhydric alcohols disclosed in the aforesaid patent, including ethylene glycol, diethylene glycol and the various amino alcohols, such as, for example, ethanolamine, the aminopropanols and the like, may be used. The polyalkylene ether glycols are also obtainable in known manner, such as by polymerization of alkylene oxides, including ethylene oxide, propylene oxide and tetrahydrofurane.

Referring now to the drawing, Figure 1 illustrates in cross-section a mixing apparatus similar to that disclosed in the aforesaid patent to P. Hoppe et al. but provided with one embodiment of this invention. Substantially enclosed mixing chamber 1 is provided with an agitator 2 and inlets 3 and 4 through which the components of the reaction mixture may be introduced. The mixing chamber may have more inlets if more than two components are utilized in formulating the reaction mixture from which the polyurethane plastic will result. The components are constantly or intermittently injected into mixing chamber 1 where they are further mixed by means of agitator 2. The resulting reaction mixture flows below agitator 2 into the area 5 and then from the mixing nozzle through orifice 6 into conduit 7. Conduit 7 is of a predetermined diameter and length depending upon the desired number and size of pores in the product. In this embodiment, a set of interchangeable conduits 7 of various diameters is provided and one conduit is exchanged for another as change in the pore size and number is desired.

Figure 2:
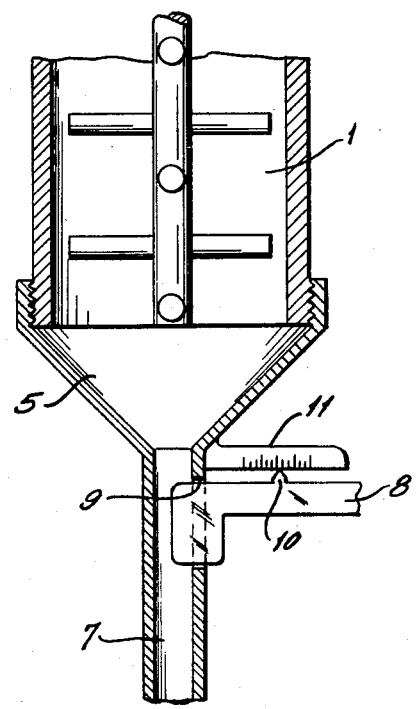
Figure 2 is a longitudinal sectional view of another embodiment of the invention in which the diameter of the discharge conduit may be varied.

The embodiment of Figure 2 is a fragmentary view showing only the mixing chamber 1 and zone 5 of the mixing nozzle. It is understood, however, that this nozzle is provided with a plurality of inlets through which the various components of the polyurethane foam plastic formulation may be introduced. This embodiment is provided with a tubular extension 7 depending from the mixing nozzle having a diaphragm 8 which may be moved through a slit 9 in tube 7. The thickness of diaphragm 8 is such that the diameter of tube 7 becomes less as diaphragm 8 is moved inwardly. Pointer 10 and graduated beam 11 are used to measure the distance diaphragm 8 extends into tube 7.

Figure 3:
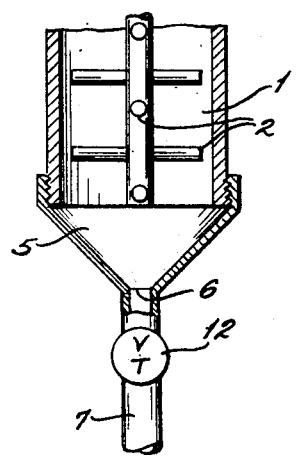
Figure 3 is a longitudinal sectional view of still another embodiment of the invention in which a valve is used to throttle the flow of liquid through the discharge conduit.

The embodiment of Figure 3 is a fragmentary cross-sectional view of a mixing apparatus similar to that of Figure 1 having mixing chamber 1, agitator 2, chamber 5 and discharge orifice 6. This embodiment also has a conduit 7 attached to discharge orifice 6. Conduit 7 is provided with a suitable throttling valve, such as, for example, a globular valve or any other valve adapted to restrict the flow of fluid through conduit 7 as the valve 12 is closed. The valve may be either hand agitated or agitated by any suitable automatic means, such as, for example, by an electric motor.

In order to illustrate the effect of the diameter of conduit 7 upon the cellular structure of the hardened polyurethane foam plastic, a series of tests was made in which the chemical composition of the reaction mixture was maintained the same and all other conditions were the same except the diameter of conduit 7 was varied. In the first of these examples, the reaction mixture was prepared from about 100 parts of a polyester prepared from about 15 mols adipic acid, about 16 mols diethylene glycol, and about 1 mol trimethylolpropane. The polyester had an hydroxyl number of about 60 and an acid number below 1. The 100 parts polyester were mixed with about 49 parts toluylene diisocyanate and about 11 parts of a mixture of about 3 parts bisdiethylaminoethanol adipate, about 1 part diethylamine oleate, about 1.5 parts of a sodium salt of a sulfonated castor oil in about 54% by weight water, about 1.5 parts sulfonated ricinoleic acid in about 54% water, about 0.3 part glycerine and about 2 parts water. This mixture, after complete mixing in an apparatus similar to that shown in Figure 1 was passed through various conduits 7 each about 10 cm. long and having the diameter indicated in the following table:

*Table I*

| Inside Diameter, mm. | Number Pores per cm.² | Pore Size, mm. |
| --- | --- | --- |
| 20 | ca. 260–320 | ca. 0.25–0.35 |
| 18 | ca. 260–320 | ca. 0.25–0.35 |
| 16 | ca. 260–320 | ca. 0.25–0.35 |
| 15 | ca. 260–320 | ca. 0.25–0.35 |
| 14 | ca. 260–320 | ca. 0.25–0.35 |
| 13.5 | ca. 260–320 | ca. 0.25–0.35 |
| 13.0 | ca. 260–320 | ca. 0.25–0.35 |
| 12.5 | ca. 220–280 | ca. 0.30–0.40 |
| 12.0 | ca. 220–280 | ca. 0.30–0.40 |
| 11.5 | ca. 220–280 | ca. 0.30–0.40 |
| 11.0 | ca. 180–220 | ca. 0.35–0.45 |
| 10.5 | ca. 180–220 | ca. 0.35–0.45 |
| 10.0 | ca. 160–200 | ca. 0.40–0.50 |
| 9.5 | ca. 140–180 | ca. 0.45–0.55 |
| 9.0 | ca. 120–160 | ca. 0.50–0.60 |
| 8.5 | ca. 110–150 | ca. 0.60–0.70 |
| 8.0 | ca. 100–140 | ca. 0.75–0.85 |
| 7.5 | ca. 90–130 | ca. 0.90–1.00 |
| 7.0 | ca. 80–120 | ca. 1.00–1.20 |
| 6.5 | ca. 60–90 | ca. 1.20–1.40 |
| 6.0 | ca. 40–60 | ca. 1.80–2.20 |
| 5.5 | ca. 30–40 | ca. 2.80–3.60 |
| 5.5 | ca. 15–25 | ca. 4.50–5.20 |

The density of the foam produced in the foregoing was about 35 kg. per cubic meter.

In another example, the following composition was used:

About 100 parts of a polyester from about 15 mols adipic acid, about 16 mols diethylene glycol, about 1 mol trimethylolpropane, with the hydroxyl number 60 and an acid number below 1
About 33.2 parts toluylene diisocyanate
About 9.5 parts of a mixture of:
  About 3 parts bis-(diethylaminoethanol) adipate
  About 1.5 parts oleate of diethylamine
  About 1.5 parts sodium salt of a sulfonated castor oil with about 54% water
About 1 part water The resulting foam had a density of about 55 kg. per cubic meter. The mixing of the components was achieved in an apparatus of the type shown in Figure 2 having a conduit 7. The diameter of conduit 7 could be varied to provide the diameter shown in the following table:

Table II

| Inside Diameter, mm. | Number Pores per cm.² | Pore Size, mm. |
| --- | --- | --- |
| 20 | ca. 950–1,050 | ca. 0.09–0.12 |
| 18 | ca. 800–900 | ca. 0.10–0.13 |
| 16 | ca. 650–750 | ca. 0.12–0.15 |
| 15 | ca. 650–750 | ca. 0.12–0.15 |
| 14 | ca. 650–750 | ca. 0.12–0.15 |
| 13.5 | ca. 650–750 | ca. 0.12–0.15 |
| 13.0 | ca. 650–750 | ca. 0.12–0.15 |
| 12.5 | ca. 650–750 | ca. 0.12–0.15 |
| 12.0 | ca. 550–650 | ca. 0.14–0.17 |
| 11.5 | ca. 550–650 | ca. 0.14–0.17 |
| 11.0 | ca. 500–550 | ca. 0.16–0.19 |
| 10.5 | ca. 450–480 | ca. 0.20–0.24 |
| 10.0 | ca. 300–350 | ca. 0.28–0.35 |
| 9.5 | ca. 220–260 | ca. 0.40–0.45 |
| 9.0 | ca. 140–180 | ca. 0.55–0.65 |
| 8.5 | ca. 80–120 | ca. 0.80–1.10 |
| 8.0 | ca. 50–70 | ca. 1.50–1.80 |
| 7.5 | ca. 30–40 | ca. 2.50–3.50 |
| 7.0 | ca. 20–25 | ca. 4.00–5.00 |
| 6.5 | | |

In another example, the following composition was used:

About 100 parts of a polyester from about 15 mols adipic acid, about 16 mols diethylene glycol, about 1 mol trimethylolpropane with an hydroxyl number 60 and an acid number below 1
About 37.4 parts toluylene diisocyanate
About 9.0 parts of a mixture of:
  About 3 parts bis-(diethylaminoethanol) adipate
  About 1 part oleate of diethylamine
  About 0.75 part sodium salt of a sulfonated castor oil with about 54% water
About 0.15 part glycerine
About 1.5 parts water
About 0.75 part sulfonated ricinoleic acid with about 54% water The resulting foam had a density of about 45 kg. per cubic meter.

Table III

| Inside Diameter, mm. | Number Pores per cm.² | Pore Size, mm. |
| --- | --- | --- |
| 20 | ca. 550–650 | ca. 0.15–0.17 |
| 18 | ca. 500–600 | ca. 0.16–0.18 |
| 16 | ca. 500–600 | ca. 0.16–0.18 |
| 15 | ca. 500–600 | ca. 0.16–0.18 |
| 14 | ca. 500–600 | ca. 0.16–0.18 |
| 13.5 | ca. 500–600 | ca. 0.17–0.20 |
| 13.0 | ca. 450–550 | ca. 0.18–0.22 |
| 12.5 | ca. 450–550 | ca. 0.18–0.22 |
| 12.0 | ca. 450–550 | ca. 0.18–0.22 |
| 11.5 | ca. 320–400 | ca. 0.25–0.30 |
| 11.0 | ca. 280–340 | ca. 0.30–0.35 |
| 10.5 | ca. 180–240 | ca. 0.40–0.50 |
| 10.0 | ca. 140–180 | ca. 0.55–0.65 |
| 9.5 | ca. 100–130 | ca. 0.75–0.85 |
| 9.0 | ca. 60–100 | ca. 1.00–1.30 |
| 8.5 | ca. 40–60 | ca. 1.80–2.10 |
| 8.0 | ca. 30–40 | ca. 2.50–3.50 |
| 7.5 | ca. 20–30 | ca. 4.00–5.00 |

From a comparison of the data shown in the foregoing tables, it is evident that the number of pores and the size of the pores is affected by the diameter of conduit 7 and thus is affected by the period of dwell of the reaction mixture in the conduit. In addition, a much more uniform pore structure is obtained.

No definitely proven theory has been advanced to explain the exact function of the conduit or extension in improving the porosity of the hardened foam. It may be that confinement of the reaction mixture in an area in which the back pressure is predetermined and controlled results in the improved pore structure because of the presence of this back pressure during the early stages of the chemical reaction. In any event, it has been found that the pore structure can be predetermined and controlled by use of the conduit or elongation adjacent the discharge orifice of the mixing apparatus. Although the mixing nozzle shown in the drawing and described in detail in U.S. Patent 2,764,565 has been found to give the best results and is thus preferred, it is possible to use any other suitable mixing apparatus in combination with conduit 7 to obtain improved pore structure.

As pointed out hereinbefore, the number of pores and the size thereof may also be predetermined and controlled by control of the length of conduit 7. For example, increasing the length of the tube from about 10 cm. to about 25 cm. has the same effect on the cell size as decreasing the diameter of a tube 10 cm. long about 0.5 mm. The diameter of the tube after it has been decreased this amount is about 15 mm.

Although the invention has been described in considerable detail in the foregoing for the purpose of illustration, it is to be understood that such detail is solely for this purpose and that variations can be made by those skilled in the art in the apparatus and process without departing from the spirit and scope of the invention except as is set forth in the claims.

What is claimed is:

1. In the preparation of a solidified cellular polyurethane by a process which comprises mixing liquid components together in a mixing chamber and flowing the resulting mixture into a suitable shaping device while it is still liquid and before any substantial amount of chemical reaction between said components, the method of predetermining the cell size and the number of cells per unit of area of solidified product which comprises flowing the said mixture while still liquid through an elongated enclosed passageway thereby retarding the flow thereof from said chamber and building up a back pressure, whereby said cell size of the product after solidification is larger and the number of cells per unit area smaller the greater the retardation of flow of liquid from said chamber.

2. In the preparation of a solidified cellular polyurethane by a process which comprises mixing liquid components together in a mixing chamber and flowing the resulting mixture into a suitable shaping device while it is still liquid and before any substantial amount of chemical reaction between said components, the method of predetermining the cell size and the number of cells per unit of area of solidified product which comprises flowing the said mixture while still liquid through an elongated conduit thereby retarding the flow thereof from said chamber and building up a back pressure, whereby said cell size of the product after solidification is larger and the number of cells per unit area smaller the greater the retardation of flow of liquid from said chamber.

References Cited in the file of this patent

UNITED STATES PATENTS

| | | |
| --- | --- | --- |
| 1,496,807 | Bullock | June 10, 1924 |
| 1,585,169 | Perkins et al. | May 18, 1926 |
| 2,450,436 | McIntire | Oct. 5, 1948 |

(Other references on following page)

UNITED STATES PATENTS

| | | |
|---|---|---|
| 2,567,949 | Lewis | Sept. 18, 1951 |
| 2,598,127 | Keckler | May 27, 1952 |
| 2,642,403 | Simon et al. | June 16, 1953 |
| 2,673,723 | Keen | Mar. 30, 1954 |
| 2,764,565 | Hoppe et al. | Sept. 25, 1956 |
| 2,816,741 | Shuffman | Dec. 17, 1957 |

FOREIGN PATENTS

| | | |
|---|---|---|
| 458,729 | Canada | Aug. 9, 1949 |
| 699,667 | Great Britain | Nov. 11, 1953 |

OTHER REFERENCES

Brown et al.: Unit Operations, p. 139, John Wiley & Sons, Inc., N.Y., copyright 1950. (Copy in Div. 15.)

Notice of Adverse Decision in Interference

In Interference No. 95,554, involving Patent No. 2,948,928, H. Ebneth and H. Falk, PROCESS FOR MANUFACTURING FOAMED POLYURETHANE ARTICLES, final judgment adverse to the patentees was rendered Oct. 19, 1976, as to claims 1 and 2.

[*Official Gazette March 22, 1977.*]